Nov. 25, 1947.  D. E. WILLIS  2,431,440
VEHICLE SPRING SUSPENSION
Filed Nov. 14, 1944  3 Sheets-Sheet 1

Inventor
Durward E. Willis
By Cameron, Kerkam+Sutton
Attorneys

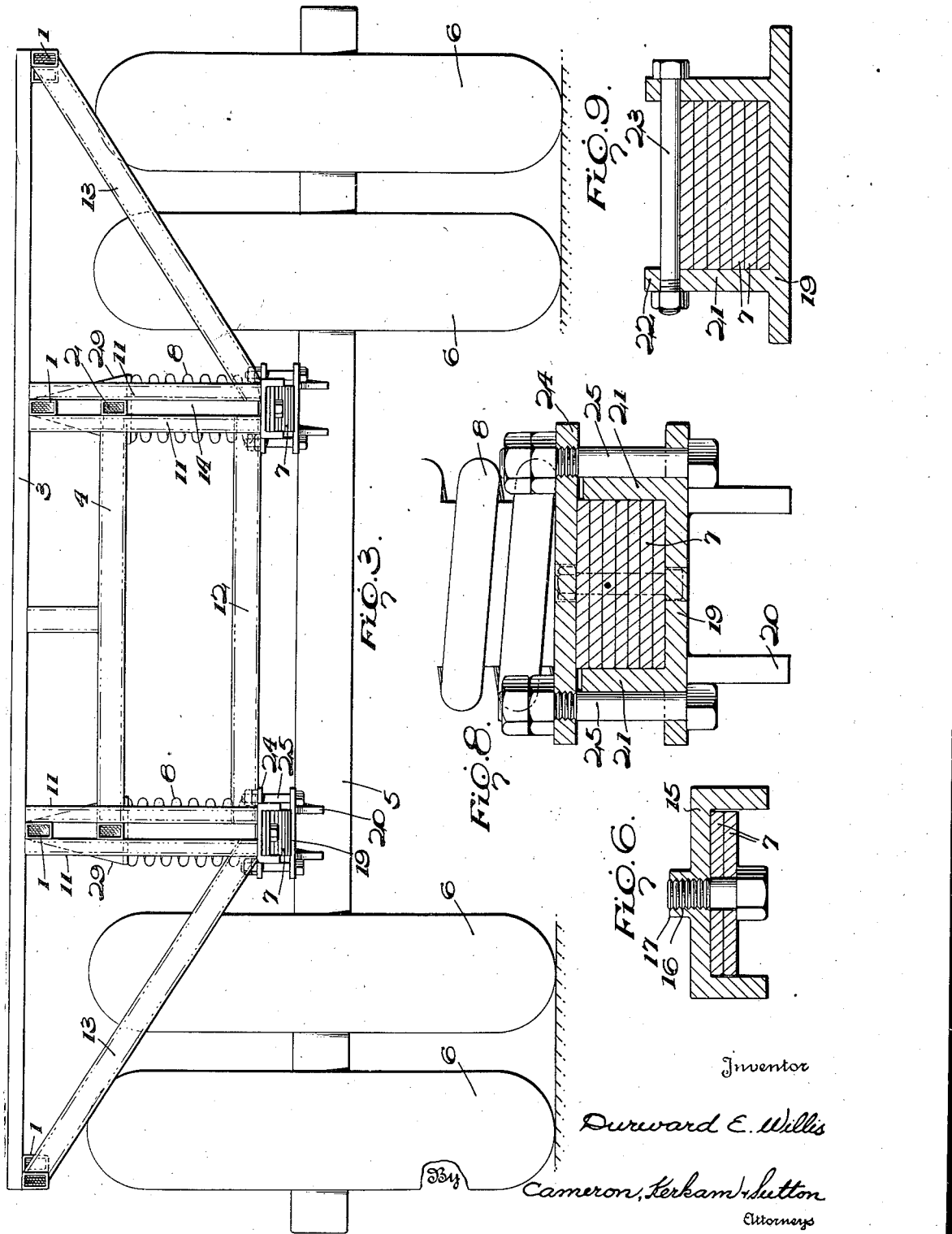

Nov. 25, 1947.  D. E. WILLIS  2,431,440
VEHICLE SPRING SUSPENSION
Filed Nov. 14, 1944  3 Sheets-Sheet 3
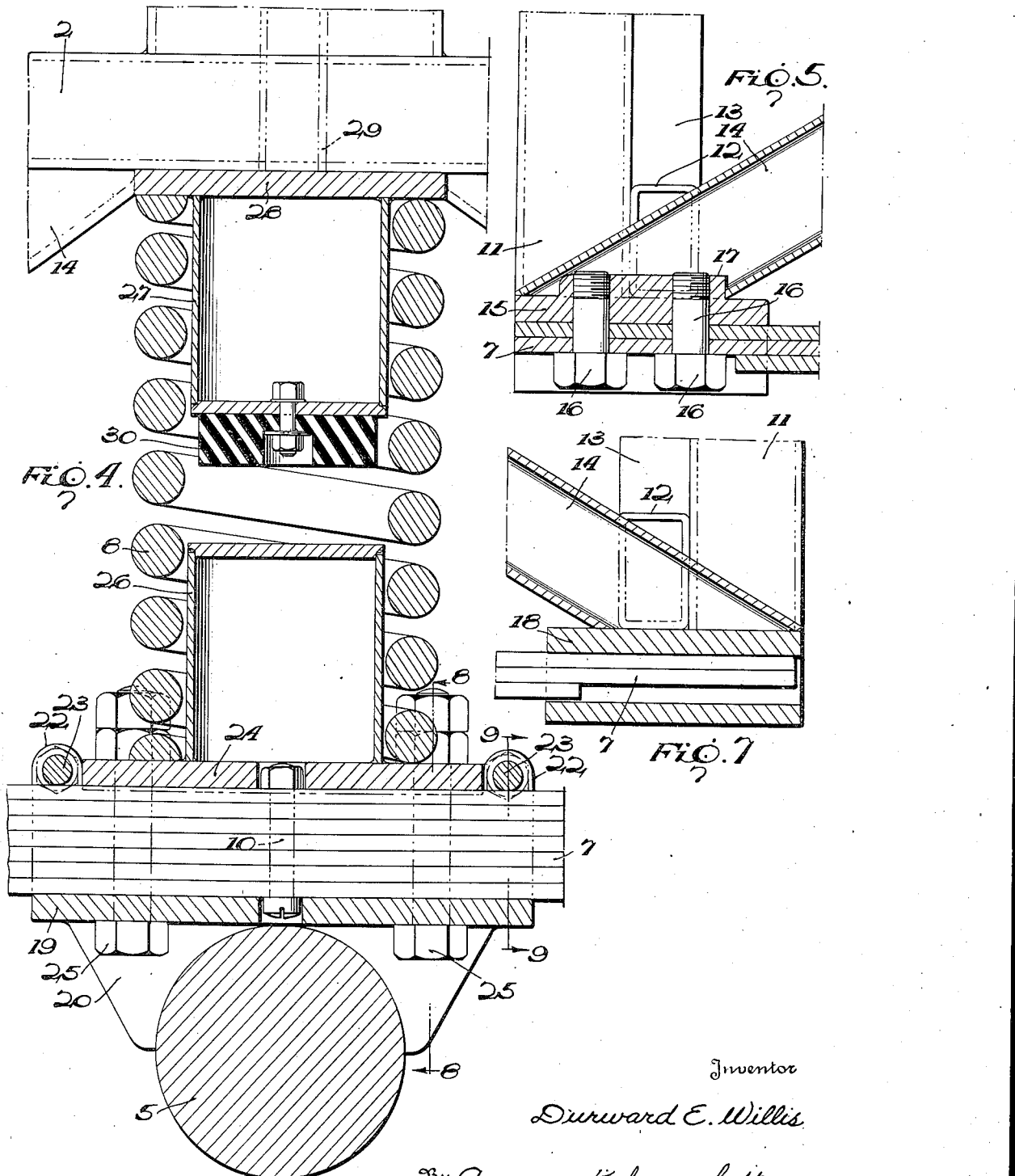

Patented Nov. 25, 1947

2,431,440

UNITED STATES PATENT OFFICE 2,431,440

VEHICLE SPRING SUSPENSION

Durward E. Willis, Tampa, Fla.

Application November 14, 1944, Serial No. 563,410

5 Claims. (Cl. 267—28)

This invention relates to spring suspensions for vehicles and is particularly intended for use with heavy duty vehicles such as freight trailers, although it will be understood that the invention may be utilized with other types of vehicles such as passenger cars and the like.

In heavy duty vehicles such as trucks, freight trailers and the like, it is difficult to provide proper springing characteristics because of the great variation in load conditions. The spring suspension is called upon to support loads varying from that of the empty vehicle body to that of the body plus a capacity load, with a margin of safety in case of overload. Separate overload springs are often provided which come into action only under extreme conditions, but nevertheless the usual elliptic or semi-elliptic springs, when made heavy and strong enough to support designed loads, are much too stiff to provide proper springing for the empty vehicle. The result is excessive jarring and jolting which not only is very uncomfortable and tiring to the driver but also causes excessive tire wear and reduces vehicle life. Various combinations of leaf springs and coil springs have been suggested for use under such conditions, but as far as I am aware none of them has been satisfactory or has gone into use to any substantial extent.

Objects of the present invention are to provide proper springing characteristics under all load conditions, thus reducing wear and increasing life in service; to decrease the weight of the spring suspension thereby increasing the permissible useful load; to eliminate oiling and similar maintenance; to employ the springs as radius rods maintaining proper axle alignment; and in general to provide a lighter, cheaper but also better spring suspension. Other objects will appear hereinafter as the description proceeds.

One embodiment of the invention has been illustrated in the accompanying drawings, but it is to be expressly understood that said drawings are for purposes of illustration only and are not to be taken as a definition of the limits of the invention, reference being had to the appended claims for this purpose.

In the drawings,

Fig. 3 is an end view of the vehicle under conditions corresponding to Fig. 2;

Fig. 4 is an enlarged view, partly in section, showing part of the spring suspension;

Figs. 5 and 6 are vertical sections at right angles to each other showing the connection of the spring suspension to the vehicle body at the lefthand side of Figs. 1 and 2;

Figure 1:
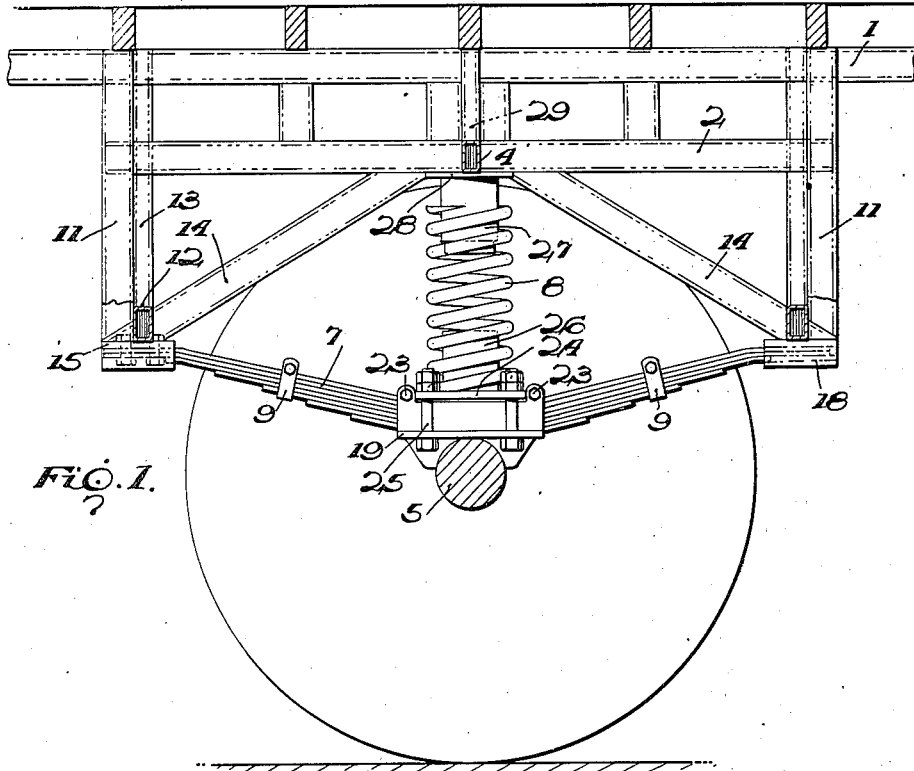
Fig. 1 is a side view of part of a vehicle body having a spring suspension embodying the present invention, this figure showing the position of the parts when the vehicle is empty.
Figure 2:
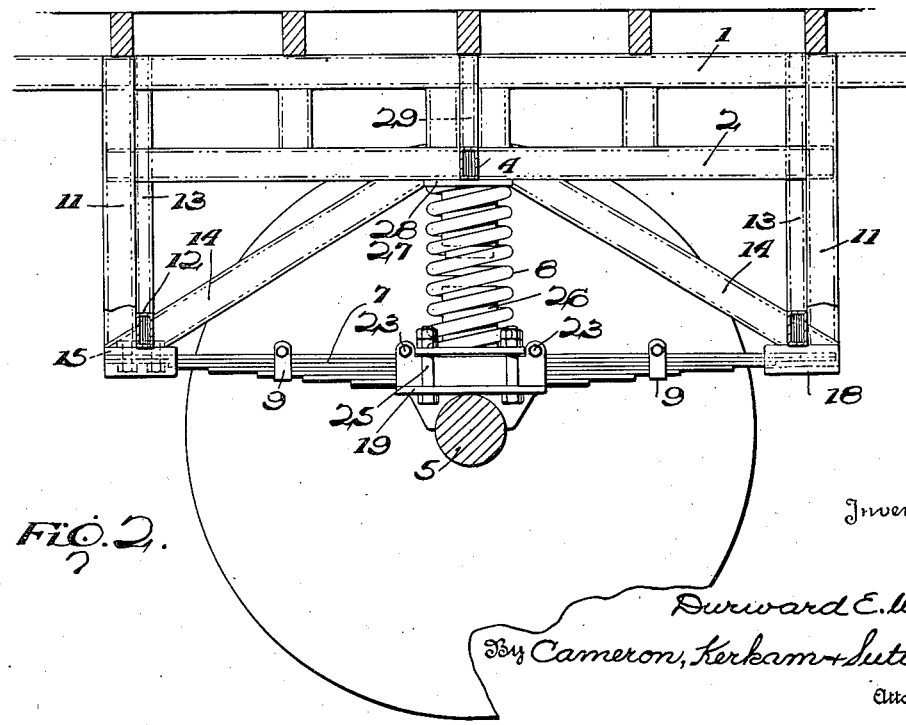
Fig. 2 is a view similar to Fig. 1 showing the position of the parts when the vehicle carries its designed load.

Fig. 7 is a vertical section showing the connection of the spring suspension to the vehicle body at the right-hand side of Figs. 1 and 2; and Figs. 8 and 9 are respectively sections on the lines 8—8 and 9—9 of Fig. 4 showing the connection of the spring suspension to the vehicle axle.

The drawings show part of a suitable vehicle frame comprising longitudinal members 1 and 2 and transverse members 3 and 4 which are secured together in any suitable manner as by welding. One axle of the vehicle is shown at 5 and four wheels are indicated diagrammatically at 6. These parts represent by way of example a trailer construction in which the invention may be embodied, but it will be understood that the details of the frame construction, the number of wheels, etc., form no part of the present invention.

The vehicle body is supported on the axle 5 by a spring suspension comprising a leaf spring 7 and a coil spring 8, the cooperative action of which is set forth in detail hereinafter. The leaf spring 7 is initially semi-elliptic as shown in Fig. 1, being designed to support the empty vehicle in its arched condition but to straighten out to a substantially flat condition as shown in Fig. 2 under the designed or normal load of the vehicle. This spring comprises a suitable number of leaves of varying length which are assembled and held together in any suitable manner as by means of bands or clips 9 and a central bolt 10. It is connected to the vehicle body in such a manner as to eliminate the wear and looseness which occur at the usual shackles and similar pivotal connections and so as to avoid the necessity for oiling and maintenance at such points. To these ends the leaf spring is connected rigidly to the vehicle body at one end and the other end is mounted in a sliding bearing, the rigid connection being shown at the left hand side of Figs. 1 and 2, which may be either toward the front or rear of the vehicle but is preferably toward the front, and the sliding connection being shown at right hand side of these figures.

The vehicle frame is designed in any suitable manner for attachment of the leaf springs thereto and in the form shown columns or posts are rigidly secured to the vehicle frame and extend a suitable distance beneath it, one for each end of each leaf spring. The construction of these columns or posts is preferably the same and in the form shown they are each made up of two hollow tubes 11 of flattened cross section which straddle and are suitably secured as by welding to the longitudinal frame members 1 and 2. The columns are connected and braced transversely by the transverse frame members 4 and by similar transverse members 12 at their lower ends. Inclined braces 13 extend outwardly and upwardly from the lower ends of the columns to the outer longitudinal frame members 1, and additional inclined braces 14 extend longitudinally and upwardly from the lower ends of the columns to the longitudinal frame members 2 as shown in Figs. 1 and 2. These means comprise a strong rigid subframe to which the spring suspension is attached, but it will be understood that the particular form and arrangement of these parts as shown herein is not necessary to the invention.

The left hand ends of the leaf springs 7 are rigidly connected in any suitable manner to spring brackets 15 at the lower ends of the left hand columns or posts 11, the details of these connections being illustrated in Figs. 6 and 7. As shown in Fig. 6, the brackets 15 are preferably made in the form of an inverted U in which the ends of two of the leaves of the springs 7 are disposed, screws 16 connecting the ends of the spring leaves rigidly to the brackets. The screws are preferably inserted from the bottom as shown in Fig. 6 so that their heads are accessible but at the same time partially protected by the side walls of the brackets. To reduce weight of the brackets while at the same time to provide sufficient thickness of metal for the screw threads, the upper walls of the brackets are thickened along their longitudinal center lines as shown at 17.

The other ends of the leaf springs 7 are mounted in sliding bearings 18 carried at the lower ends of the right hand columns 11, the details of these bearings being shown in Fig. 7. The bearing members 18 comprise boxes having openings of rectangular cross section and of proper dimensions to receive the ends of three of the leaves of the spring and to completely surround these ends so that lateral and vertical movement is prevented but the ends of the leaves are capable of longitudinal sliding movement to accommodate the flexing of the springs. These bearings 18 are preferably of a dry type which requires no oiling, such as the "Oilite" bearing well known in the art.

The central portions of the leaf springs are supported on and rigidly secured to the axle 5 by means preventing any relative lateral movement and also providing a seat for the coil spring 8, as best shown in Figs. 4, 8 and 9. A suitable spring support or bracket 19 rests on the axle and is connected thereto in any suitable manner as by means of the longitudinal ribs 20 which extend approximately half way around the axle and are preferably welded thereto. The bracket 19 comprises vertical sides 21 which constitute a U-shaped enclosure for the leaf spring assembly as shown in Figs. 8 and 9, the bottom wall of this enclosure being recessed to receive the head of the bolt 10 as shown in Fig. 4. Ears 22 are formed at the ends of the sides 21, and bolts 23 extend between these ears over the top of the leaf spring assembly as shown in Fig. 9 to aid in retaining it in the bracket.

A plate 24 rests on the upper leaf of the spring assembly between the transverse bolts 23 and is securely fastened in this position by four bolts 25 which extend outside the side walls 21 of the bracket. Thus the plate 24 constitutes an additional means for holding the leaf spring assembly in the bracket, while at the same time it provides a bottom seat for the coil spring 8. Preferably the plate 24 is provided with a vertical projection 26 which extends upwardly within the lower end of the coil spring as clearly shown in Fig. 4, this projection being cylindrical in shape and of a size to fit fairly snugly within the spring coil.

When the vehicle body is unloaded as shown in Fig. 1, its upper end is spaced from the frame of the vehicle and the coil spring has no function. In this position, however, the upper end of the spring is supported and guided by a cylindrical projection 27 like the projection 26 but depending from the upper spring seat 28 within the free upper end of the coil spring. The spring seat 28 is secured to the longitudinal frame member 2 as by welding, and may be suitably braced as by the gusset members 29. One of the members 26 or 27 preferably carries a buffer block 20 of suitable material such as hard rubber.

When the vehicle is empty, the body is supported by the arched semi-elliptic springs 7 as shown in Fig 1, the coil spring 8 being inactive. The springs 7 may accordingly be designed with respect only to the load of the empty vehicle body and so as to provide proper springing characteristics for the body under these conditions. When the body is loaded with its designed or normal load, however, the frame descends relative to the axle and the seats 28 engage the upper ends of the coil springs 8 and compress them while at the same time the leaf springs 7 straighten out to substantially flat position shown in Fig. 2. Under this condition the major part of the load is carried by the coil springs which are substantially stronger than the leaf springs.

Accordingly the leaf springs may be relatively light as compared with the usual springs of this type, and the combined weight of the light leaf springs and coil springs is substantially less than the weight of semi-elliptic springs capable of carrying the designed load of the vehicle. As a result the useful load of the vehicle is substantially increased, while at the same time proper springing characteristics are provided whether the vehicle is empty or loaded to capacity.

The arrangement of the leaf springs also provides the functions of radius rods maintaining the axle in proper alignment. The rigid connection of the leaf springs to the vehicle body at one end, plus the restraint against lateral movement at the other ends, and the elimination of wear and possible loose connections at these points, all contribute to provide proper radius rod action. The connections of the leaf springs to the axle are also designed to the end that lateral movement of the axle relative to the leaf springs is prevented. The slight extension of the leaf springs which takes place as they straighten from the arched condition of Fig. 1 to the flat condition of Fig. 2 is accommodated by the sliding movement of the ends of the leaf springs in the bearings 18. The slight longitudinal displacement of the axle as the leaf springs flex is permitted by flexing of the coil springs.

For proper radius rod action it is also desirable for the leaf springs to be designed so that they are substantially flat as shown in Fig. 2 when the vehicle is loaded. When the loaded vehice is travelling on the road, the deflection of the leaf springs takes place substantially equally above and below the horizontal planes of these springs as shown in Fig. 2 so as to maintain a minimum amount of misalignment of the axle under unequal load conditions and inequalities of road surface.

The engagement of the spring seat 28 with and its disengagement from the coil spring takes place only as the vehicle is being loaded or unloaded, respectively, and during operation of the vehicle these parts are either constantly engaged or constantly disengaged depending on whether the vehicle is loaded or empty. Thus wear between these parts is minimized, while the rigid connection of the spring seat to the frame prevents wear at this point. In addition to the foregoing advantages, wear and adjustment of shackles and the like are avoided and lubrication is practically eliminated, so that maintenance is reduced to a minimum.

While only one embodiment of the invention has been illustrated and described, it will be understood that the invention is not limited thereto but is capable of other uses, and also that various changes may be made in the form, details of construction and arrangement of the parts without departing from the spirit of the invention. Reference should therefore be had to the appended claims for a definition of the limits of the invention.

What is claimed is:

1. A spring suspension for supporting a vehicle body on its axle comprising a main coil spring seated on the axle and supporting the major part of the weight of the loaded vehicle body, a relatively weak semi-elliptic leaf spring secured to the axle and having one end anchored to the vehicle body to serve as a radius rod for the axle, a sliding bearing on the body for the other end of said semi-elliptic spring permitting longitudinal movement of the spring leaves but restraining them against lateral movement, the connections of said leaf spring to the body being constructed and arranged in relation to the compression of said main coil spring under load so that the leaf spring is substantially flat when the vehicle body is normally loaded, said leaf spring arching when the body is empty to lift and support it above and spaced from the then free upper end of said main coil spring.

2. A spring suspension for supporting a vehicle body on its axle comprising a main coil spring seated on the axle and supporting the major part of the weight of the loaded vehicle body, a semi-elliptic spring secured to the axle and having one end anchored to the body, a sliding bearing on the body for the other end of said semi-elliptic spring, said semi-elliptic spring being weak relative to said main coil spring but capable in its arched condition of supporting the empty vehicle body leaving said main coil spring free of load.

3. A spring suspension for supporting a vehicle body on its axle comprising a main coil spring seated on the axle and supporting the major part of the weight of the loaded vehicle body, a spring seat on the body for the upper end of said spring, a semi-elliptic spring secured to the axle and having one end anchored to the body, a sliding bearing on the body for the other end of said semi-elliptic spring, said semi-elliptic spring being weak relative to said main coil spring but capable in its arched condition of supporting the empty vehicle body with said spring seat spaced from the upper end of said main spring.

4. A spring suspension for supporting a vehicle body on its axle comprising a main coil spring seated on the axle and supporting the major part of the weight of the loaded vehicle body, a spring seat on the body for the upper end of said spring, a semi-elliptic spring secured to the axle and having one end anchored to the body, a sliding bearing on the body for the other end of said semi-elliptic spring, said semi-elliptic spring being weak relative to said main coil spring but capable in its arched condition of supporting the empty vehicle body with said spring seat spaced from the upper end of said main spring, and spring guiding means on said body for maintaining the alignment of said main spring with its seat when the latter is elevated above the spring.

5. A spring suspension for supporting a vehicle body on its axle comprising a main coil spring seated on the axle and supporting the major part of the weight of the loaded vehicle body, a spring seat on the body for the supper end of said spring, a semi-elliptic spring secured to the axle and having one end anchored to the body, a sliding bearing on the body for the other end of said semi-elliptic spring, said semi-elliptic spring being weak relative to said main coil spring but capable in its arched condition of supporting the empty vehicle body with said spring seat spaced from the upper end of said main spring, and spring guiding means on said body for maintaining the alignment of said main spring with its seat when the latter is elevated above the spring, loading of the vehicle body bringing said seat into engagement with and compressing said main coil spring to normally loaded position and said semi-elliptic spring being proportioned in relation to said main spring so that it is brought to substantially flat position when said main spring is compressed to said normally loaded position.

DURWARD E. WILLIS.

REFERENCES CITED

The following references are of record in the file of this patent:

UNITED STATES PATENTS

| Number | Name | Date |
| --- | --- | --- |
| 871,920 | Falkenhainer | Nov. 26, 1907 |
| 2,209,632 | Martin | July 30, 1940 |
| 2,229,808 | Jennings | Jan. 28, 1941 |
| 2,352,446 | Pointer | June 27, 1944 |
| 1,768,494 | Schjolin | June 24, 1930 |
| 1,952,718 | Lee | Mar. 27, 1934 |
| 1,956,549 | Carter | May 1, 1934 |
| 2,045,031 | Thompson | June 23, 1936 |